US011988325B2

(12) United States Patent
Lane et al.

(10) Patent No.: US 11,988,325 B2
(45) Date of Patent: May 21, 2024

(54) EXPANDABLE DEVICE FOR A PORTABLE ELECTRONIC DEVICE

(71) Applicant: PopSockets LLC, Boulder, CO (US)

(72) Inventors: Robert Lane, Boulder, CO (US); Sara Cinnamon, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 389 days.

(21) Appl. No.: 17/137,889

(22) PCT Filed: Jun. 17, 2019

(86) PCT No.: PCT/US2019/037428
§ 371 (c)(1),
(2) Date: Dec. 30, 2020

(87) PCT Pub. No.: WO2020/009796
PCT Pub. Date: Jan. 9, 2020

(65) Prior Publication Data
US 2023/0134303 A1   May 4, 2023

Related U.S. Application Data

(60) Provisional application No. 62/693,515, filed on Jul. 3, 2018.

(51) Int. Cl.
F16M 13/00       (2006.01)
F16M 11/38       (2006.01)
(52) U.S. Cl.
CPC .......... F16M 13/005 (2013.01); F16M 11/38 (2013.01)

(58) Field of Classification Search
CPC ...... F16M 13/005; F16M 13/04; F16M 11/28; F16M 11/40; F16M 11/38; F16M 11/10;
(Continued)

(56) References Cited

U.S. PATENT DOCUMENTS 4,915,540 A * 4/1990 Kennedy ............... E21F 17/103
188/371
10,113,691 B2 * 10/2018 Grieve ................... G06F 1/1626
(Continued)

OTHER PUBLICATIONS

Transmittal of the International Search Report and Written Opinion issued in PCT/US2019/037428 dated Jan. 9, 2020.

*Primary Examiner* — Ingrid M Weinhold
(74) *Attorney, Agent, or Firm* — Irell & Manella LLP

(57) ABSTRACT

An expandable device includes a base having a top side and a bottom side, an expanding mechanism operably coupled to the base, and a button. The bottom side of the base is adapted to engage a portion of a portable electronic device. The button has a top side and a bottom side and is operably coupled to the expanding mechanism. The expanding mechanism is selectively movable between a first configuration whereby the button is disposed in a first, collapsed configuration and a second configuration whereby the button is disposed in a second, expanded configuration. Upon urging the button to the first configuration, the expandable device retains the button in the first configuration, and upon further urging the button towards the base, the button is released from the first configuration and moves to the second configuration.

12 Claims, 5 Drawing Sheets

(58) Field of Classification Search
CPC ..... H04B 2001/3861; A45F 2200/0516; A45F 5/10; H05K 5/023; H04M 1/04
USPC ........ 248/688, 459, 346.3, 564, 570; 16/405
See application file for complete search history.

(56) References Cited

U.S. PATENT DOCUMENTS

| | | | |
|---|---|---|---|
| 10,200,518 B2 * | 2/2019 | Richter | A45F 5/00 |
| 10,638,627 B1 * | 4/2020 | Stime | F16M 11/10 |
| D883,273 S * | 5/2020 | Chen | D14/253 |
| 10,724,280 B1 * | 7/2020 | Srour | F16M 11/121 |
| 10,774,871 B1 * | 9/2020 | Srour | F16C 11/12 |
| 10,897,984 B2 * | 1/2021 | Roth | A45F 5/00 |
| 10,972,596 B1 * | 4/2021 | Blau | H04M 1/04 |
| D921,359 S * | 6/2021 | Roth | D3/218 |
| D928,764 S * | 8/2021 | Yeo | D14/251 |
| 11,274,697 B2 * | 3/2022 | Srour | F16F 1/428 |
| 2012/0043452 A1 | 2/2012 | Karmatz | |
| 2016/0069512 A1 * | 3/2016 | Grieve | A45F 5/00 294/142 |
| 2016/0249472 A1 * | 8/2016 | Tu | F16M 13/00 |
| 2017/0195000 A1 | 7/2017 | Srour | |
| 2018/0051851 A1 | 2/2018 | Hobbs et al. | |
| 2018/0146078 A1 * | 5/2018 | Shin | F16F 1/043 |
| 2018/0262603 A1 * | 9/2018 | Richter | H04M 1/04 |
| 2018/0348541 A1 * | 12/2018 | Radzwill | A45C 11/04 |
| 2020/0326030 A1 * | 10/2020 | Surani | F16M 11/38 |
| 2021/0231970 A1 * | 7/2021 | Radzwill | G02C 5/006 |

\* cited by examiner

EXPANDABLE DEVICE FOR A PORTABLE ELECTRONIC DEVICE

PRIORITY CLAIM

This application is a National Stage of International Application No. PCT/US19/37428, filed Jun. 17, 2019, which claims the benefit of U.S. Provisional Patent Application No. 62/693,515, filed Jul. 3, 2018, is hereby claimed and the entire contents thereof are incorporated herein by reference.

FIELD OF THE DISCLOSURE

The present disclosure generally relates to an expandable device and, more particularly, to expandable devices that can be attached to a portable electronic device or a case for a portable electronic device and used as grips, stands, or for other purposes.

BACKGROUND

Portable electronic devices, such as MP3 players and smart phones, are often housed in protective covers or cases in order to protect the device from damage, provide a grip for handling the device, and/or provide a stand for propping the device on a surface. Such cases increase the effective size of the device. Expandable devices and accessories, which may be attached directly to the device or to the case protecting the device, are used for a variety of functions, including propping the device on a surface and providing an expandable grip for handling the device. The expandable devices have decorative buttons, which may display logos, decals, symbols, or other artistic renderings.

SUMMARY

In accordance with one aspect, an expandable device includes a base having a top side and a bottom side, an expanding mechanism operably coupled to the base, and a button. The bottom side of the base is adapted to engage a portion of a portable electronic device. The button has a top side and a bottom side, the bottom side of the button being operably coupled to the expanding mechanism. The expanding mechanism is selectively movable between a first configuration whereby the button is disposed in a first, collapsed configuration and a second configuration whereby the button is disposed in a second, expanded configuration. Upon urging the button to the first configuration, the expandable device retains the button in the first configuration, and upon further urging the button towards the base, the button is released from the first configuration and moves to the second configuration.

In some approaches, the expanding mechanism includes a structure constructed from a resilient material. The expanding mechanism may be at least one foldable elongated member that is biased towards the second configuration. In some forms, the at least one foldable elongated member may be at least one accordion fold. In other forms, the at least one foldable elongated member may be at least one elongated strip pivotably coupled to the base and the button. In yet other forms, the expanding mechanism may be a foam member being biased towards the second configuration.

In some approaches, the expandable device may further include a locking device to lock the button in the first, collapsed configuration. The locking device may be in the form of a first locking region disposed on a portion of the button and a second, corresponding locking region disposed on a portion of the base to couple to the first locking region. The first locking region may be a tab, and the second locking region may be a corresponding groove. The locking regions may be frictionally coupled to each other. In other examples, the locking device may be a portion of the expanding mechanism. This portion of the expanding mechanism may be biased towards the first configuration.

In accordance with another aspect, an expandable device includes a base having a top side and a bottom side, an expanding mechanism in the form of at least one foldable elongated member operably coupled to the base, and a button. The bottom side of the base is adapted to engage a portion of a portable electronic device. The button has a top side and a bottom side, the bottom side of the button being operably coupled to the expanding mechanism. The expanding mechanism is selectively movable between a first configuration whereby the button is disposed in a first, collapsed configuration and a second configuration whereby the button is disposed in a second, expanded configuration. Upon urging the button to the first configuration, the expandable device retains the button in the first configuration, and upon further urging the button towards the base, the button is released from the first configuration and moves to the second configuration In accordance with yet another aspect, an expandable device includes a base having a top side and a bottom side, an expanding mechanism in the form of at least one foam member operably coupled to the base, and a button. The bottom side of the base is adapted to engage a portion of a portable electronic device. The button has a top side and a bottom side, the bottom side of the button being operably coupled to the expanding mechanism. The expanding mechanism is selectively movable between a first configuration whereby the button is disposed in a first, collapsed configuration and a second configuration whereby the button is disposed in a second, expanded configuration. Upon urging the button to the first configuration, the expandable device retains the button in the first configuration, and upon further urging the button towards the base, the button is released from the first configuration and moves to the second configuration

BRIEF DESCRIPTION OF THE DRAWINGS

The above needs are at least partially met through provision of the expandable device for a portable electronic device described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, expandable devices for portable electronic devices are provided that include a base and an expanding mechanism that is movable relative to the base between a collapsed configuration and an expanded configuration. The expanding mechanism is movable in a number of directions (e.g., about a pivot portion that pivotably couples to the base) to allow for movement between collapsed states and expanded states projecting upwardly from the base. The expandable devices may further include a button coupled to the body.

Figure 1:
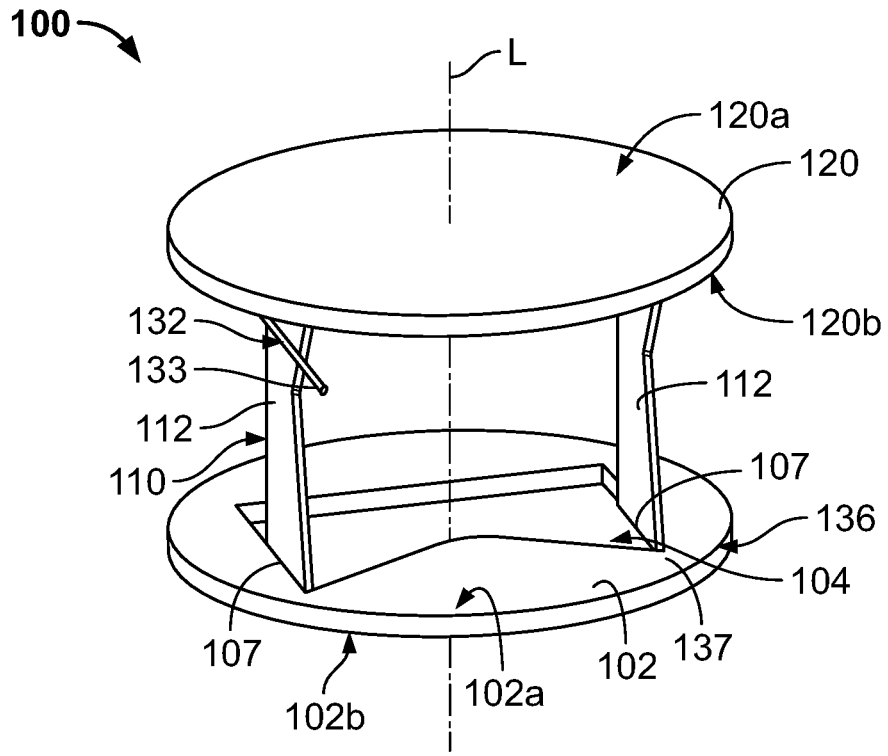
FIG. 1 illustrates a perspective view of an example expandable device in accordance with various embodiments.
Figure 2:
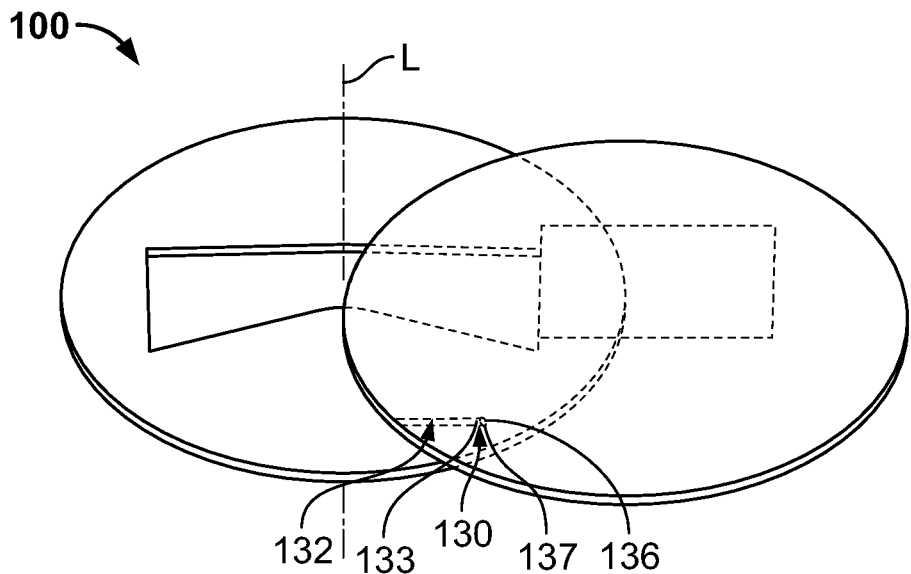
FIG. 2 illustrates a perspective view of the expandable device of FIG. 1 in a collapsed configuration in accordance with various embodiments.

A first embodiment of an expandable device 100 is shown in FIGS. 1 and 2. The expandable device 100 includes a base 102, an expanding mechanism 110 operably coupled to the base 102, and a button 120. The base 102 has a top or upper side 102a and a bottom or lower side 102b. The bottom side 102b of the base 102 is attachable to a portable electronic device (not shown), a case for a portable electronic device, or other desired component.

The base 102 further includes a cutout 104 to accommodate a portion of the expanding mechanism 110 (as will be described in further detail below). Further, in some examples, the base 102 may include a coupling or locking region 136 to secure the expandable device 100 in a collapsed configuration (as will be discussed in further detail below).

The expanding mechanism 110 is operably coupled to the base 102 via any number of suitable approaches. For example, in the illustrated embodiment of FIGS. 1 and 2, the expanding mechanism 110 is in the form of a plurality of legs 112 that extend upwardly from the base 102. Any number of legs 112 may be used as desired. The plurality of legs 112 may be integrally attached to the base 102 via fold 107. In some examples, the plurality of legs 112 may be coupled to the base 102 via any number of other suitable approaches such as, for example, an adhesive, ultrasonic welding, a snap or friction fit, and the like.

The plurality of legs 112 may be constructed from any number of suitable materials such as, for example, a resilient or shape-retentive material (e.g., a polyester-based thermoplastic polyurethane elastomer) that biases or urges the expandable device 100 towards an expanded and/or a collapsed configuration, depending on a relative positioning and angle between the base 102 and the legs 112. In another example, the expandable device 100 can include a spring or other biasing member (not shown) disposed between the base 102 and the button 120.

At least one of the plurality of legs 112 may be positioned proximally to the cutout 104 formed in the base 102, and may have similar dimensions and/or shape as the dimensions and/or shape of the cutout 104. As a result, the plurality of legs 112 are foldable to extend across the base 102 and into the cutout 104 in the collapsed state (FIG. 2).

The button 120 includes a top or upper side 120a and a bottom or inner side 120b and is operably coupled to at least one of the plurality of legs 112. The button 120 may be removable from the expandable device 100. The button 120 may have artistic value (e.g., the button 120 may include an artistic rendering, a logo, a symbol, text, or a decal), the button 120 may provide a grip that allows a user to slide their fingers between the bottom side 120b and the base 102 when the plurality of legs 112 are in the expanded configuration such that the top side 120a of the button 120 is disposed adjacent to the palm of the user's hand, and may further provide a space in which a cord, such as a cord for earphones, may be wrapped and stored around a portion of the plurality of legs 112. As such, in some examples, it may be desirable to remove the button 120 and replace it with another button 120 that features a different aesthetic design and/or provides a different grip so as to change the look and/or function of the expandable device 100.

The plurality of legs 112 are coupled to the bottom side 120b of the button via any number of suitable approaches. For example, the plurality of legs 112 may be integrally attached to the button 120 via a fold (not shown). In other examples, the plurality of legs 112 may be coupled to the button 120 via any number of suitable approaches such as, for example, and adhesive, ultrasonic welding, a snap or friction fit, and the like. The bottom side 120b of the button may also include a cutout (not shown) resembling the cutout 104 formed on the base 102 to accommodate a portion of the plurality of legs 112 when the expandable device 100 is in the collapsed configuration.

In operation, the expandable device 100 may be positioned in an expanded configuration (FIG. 1) or a collapsed configuration (FIG. 2) by manipulating the button 120. Generally, the user of the expandable device 100 may move the expandable device 100 from the collapsed configuration (FIG. 2) to the expanded configuration (FIG. 1) by, for example, grabbing or grasping the button 120 and moving (e.g., pulling) the button 120 upward, away from the base 102, along the longitudinal axis L. Conversely, the user of the expandable device 100 may move the expandable device 100 from the expanded configuration to the collapsed configuration by, for example, grabbing or grasping the button 120 and pushing the button 120 downward, toward the base 102. In either of these movements, the plurality of legs 112 will pivot about the fold 107 and the corresponding coupling region (e.g., a fold; not shown) of the plurality of legs 112 and the bottom side 120b of the button 120. As stated, at least one of the plurality of legs 112 may nest within the cutout 104 when in the collapsed configuration. While the illustrated embodiment of FIGS. 1 and 2 depict the plurality of legs 112 rotating clockwise when transitioning the expandable device 100 to the collapsed configuration, the plurality of legs 112 may alternatively rotate counter-clockwise when transitioning to the collapsed configuration.

In examples where the plurality of legs 112 and/or the base 102 are constructed from a shape retentive material, the expandable device 100 may remain in whatever position it was last placed in. For example, the expandable device 100 may be automatically retained in an expanded configuration, a collapsed configuration, or a partially-expanded configuration between the expanded and collapsed configurations.

In examples where the plurality of legs 112 and/or the base 102 are constructed from a resilient material, the plurality of legs 112 may urge the button 120 towards the expanded configuration. In these examples, and as briefly mentioned above, the expandable device 100 may include a locking device 130 that may in turn lock, or securely retain, the expandable device 100 in the collapsed configuration. For example, the locking device 130 may be in the form of a first locking region 132 disposed on a portion of the button 120 and a second locking region 136 disposed on a portion of the base 102 that couples to the first locking region 132. In the illustrated example, the first locking region 132 is in the form of an elongated hook or protrusion 133, and the second locking region 136 is in the form of a corresponding slot or groove 137. The protrusion 133 is insertable into the groove 137 when the expandable device 100 is transitioned to the collapsed configuration and accordingly, the protrusion 133 is retained within the groove 137 and resists the biasing force exerted by the plurality of resilient legs 112.

In some examples, the protrusion 132 and the groove 136 form a frictional connection that is sufficient to overcome the biasing force of the plurality of legs 112. In other examples, the first and second locking regions 132, 136 are in the form of a push-to-eject mechanism whereby one of the first or the second locking regions 132, 136 includes a spring-driven member that moves along a cammed track (not shown) to selectively retain or expel the other locking region 132, 136 similar to the operation of a touch latch or a press-to-open system used in click-pens. In these examples, a user may press the button 120 towards the base 102 to secure the button 120 thereto, and may again press the button 120 towards the base 102 to cause the button to be decoupled from the base 102. Other examples of push-to-release mechanisms are possible.

In other examples, the plurality of legs 112 and/or the base 102 are constructed from a material (e.g., a shape retentive and/or a resilient material) that is capable of "snapping" to one or both of the expanded configuration and the collapsed configuration. In other words, the plurality of legs 112 may be originally positioned in the expanded position, and upon pressing on the button 120 to urge the expandable device 100 to the collapsed configuration, the plurality of legs 112 may initially resist the pressing force. However, upon continued urging towards the collapsed configuration, the plurality of legs 112 may snap to the folded, collapsed configuration. In a similar manner, upon urging the expandable device 100 to the expanded configuration, the plurality of legs 112 may initially resist this pulling force until reaching a certain point, whereby the plurality of legs 112 may snap to the expanded configuration. Other examples of suitable components and/or mechanisms are possible.

Figure 3:
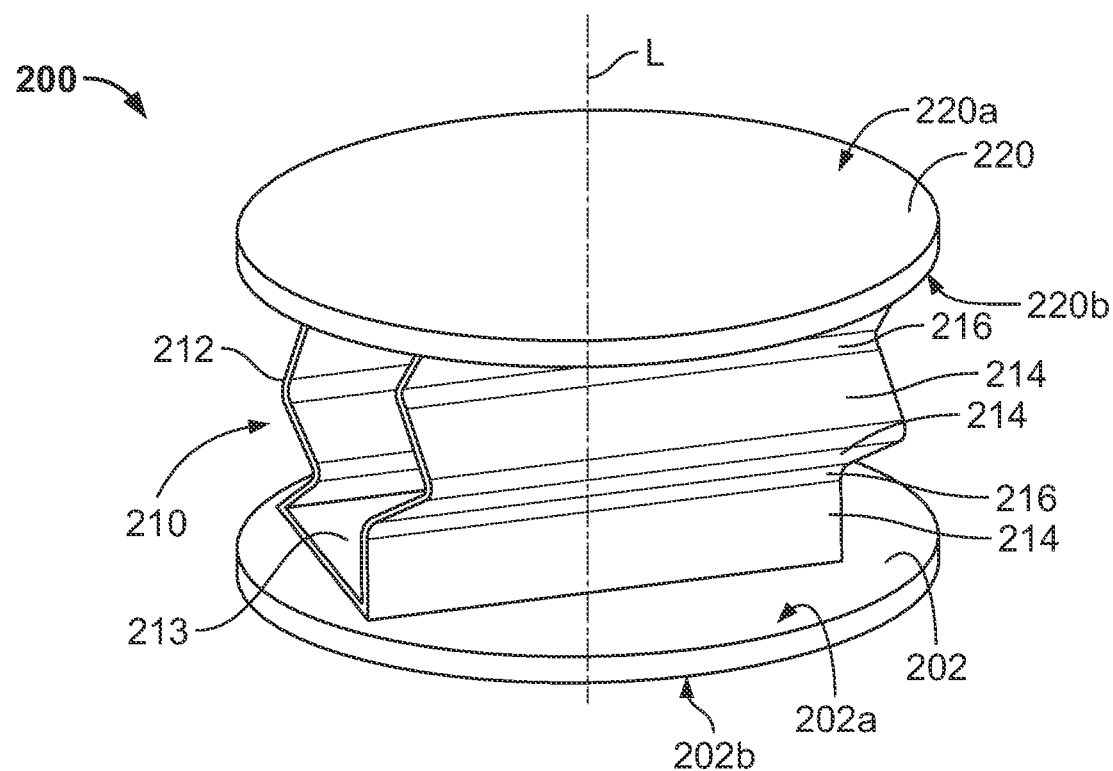
FIG. 3 illustrates a perspective view of a second example expandable device in accordance with various embodiments.
Figure 4:
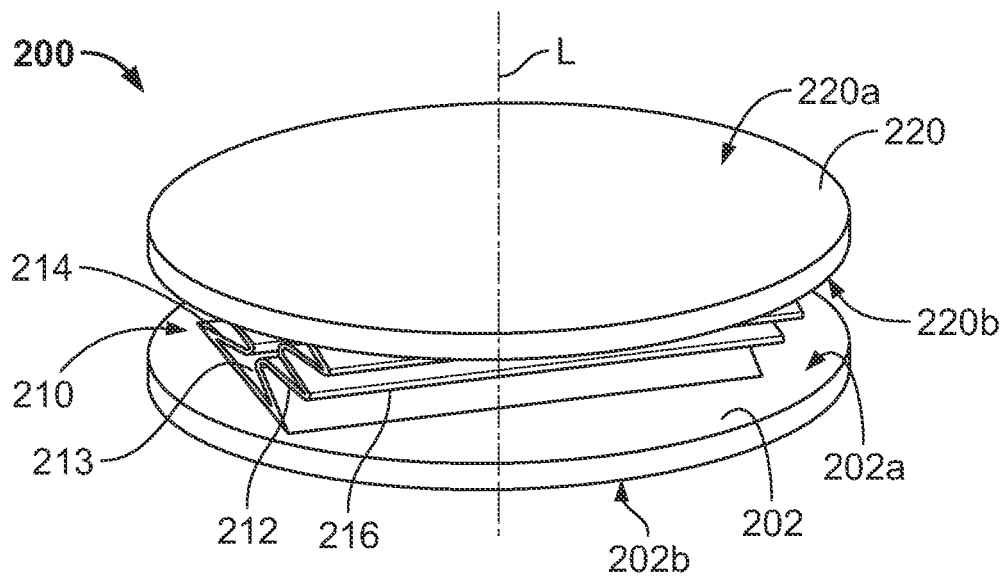
FIG. 4 illustrates a perspective view of the expandable device of FIG. 3 in a collapsed configuration in accordance with various embodiments.

A second embodiment of an expandable device 200 is shown in FIGS. 3 and 4. It will be appreciated that the expandable device 200 illustrated in FIGS. 3 and 4 may include similar features to the expandable device 100, and thereby elements illustrated in FIGS. 3 and 4 are designated by similar reference numbers indicated on the embodiment illustrated in FIGS. 1 and 2, increased by 100. Accordingly, these features will not be described in substantial detail.

In this form, the expanding mechanism 210 is in the form of a folded assembly that is coupled to the base 202. As with the plurality of legs 112 of the expandable device 100, the folding mechanism 210 may include any number of foldable legs 212 may be integrally formed with the base 202 having a top side 202a and bottom side 202b, or alternatively, the foldable legs 212 may be affixed thereto using any number of suitable approaches. In the illustrated example, the foldable legs 212 include a base member 213 that is secured to the top side 202a of the base 202. The foldable legs 212 may be coupled to the bottom side 220b of the button 220 in a similar manner. The button 220 also has a top side 220a.

The foldable legs 212 are configured to be compressed to move the button 220 between an expanded configuration (FIG. 3) and a collapsed configuration (FIG. 4). The foldable legs 212 may have an accordion-like configuration that includes a number of body sections 214 that are partitioned by leg folds 216. It is appreciated that any number of desired body portions 214 may be used in the expandable device 200 to alter its size and shape.

Similarly to the expandable device 100 of FIGS. 1 and 2, the expandable device 200 may be positioned in an expanded configuration (FIG. 3) or a collapsed configuration (FIG. 4) by manipulating the button 220. The user of the expandable device 200 may move the expandable device 200 from the expanded configuration (FIG. 3) to the collapsed configuration (FIG. 4) by, for example, grabbing or grasping the button 220 and pushing the button 220 downward, toward the base 202, along the longitudinal axis L. As a result, the body sections 214 will pivot about the leg folds 216 and will be compressed, generally being positioned in a zigzag configuration. As a result, the body sections 214 will be positioned approximately perpendicularly to the longitudinal axis L.

Conversely, the user of the expandable device 200 may move the expandable device 200 from the collapsed configuration (FIG. 4) to the expanded configuration (FIG. 3) by, for example, grabbing or grasping the button 220 and moving (e.g., pulling) the button 220 upward, away from the base 202, along the longitudinal axis L. As a result, the body sections 214 will extend generally upwards relative to the base 202 in a direction that is approximately parallel to the longitudinal axis L. In either of these movements, the foldable legs 212 will expand or compress, respectively, to position the button 220 in the desired configuration.

As with the plurality of legs 112 of the expandable device 100 of FIGS. 1 and 2, the foldable legs 212 may be constructed from a shape retentive material, a resilient material (e.g., a polyester-based thermoplastic polyurethane elastomer), and/or a material capable of "snapping" the button 220 to a desired configuration. The expandable device 200 may include a locking device (not shown) similar to the locking device 130 described above that locks the button 220 in the collapsed configuration.

Figure 5:
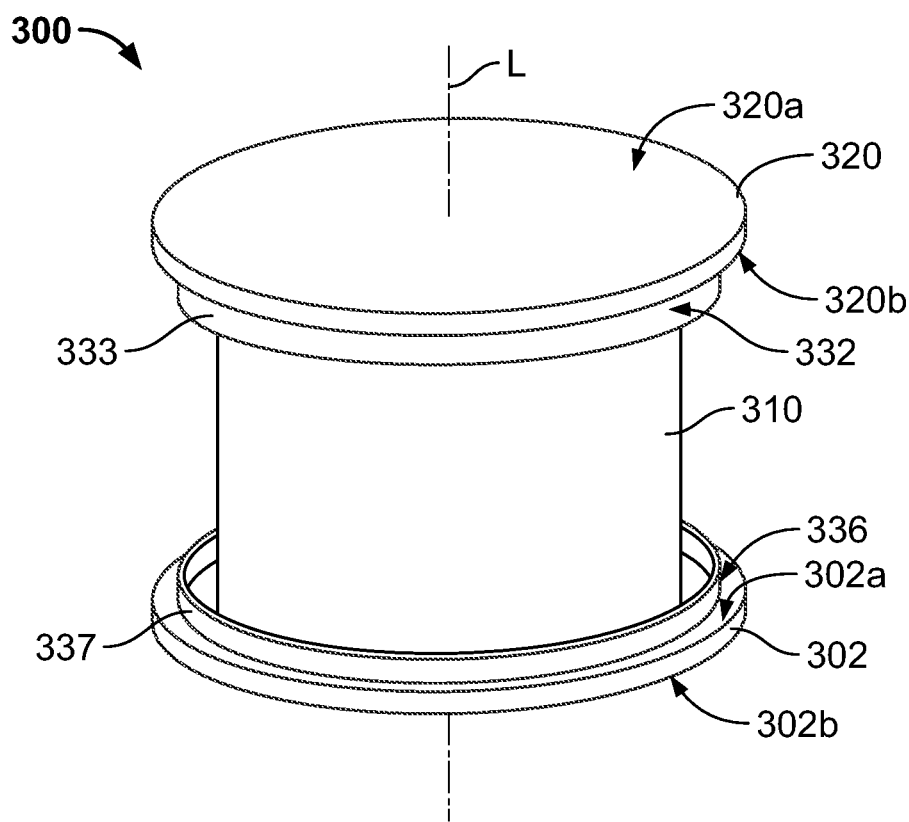
FIG. 5 illustrates a perspective view of a third example expandable device in accordance with various embodiments.
Figure 6:
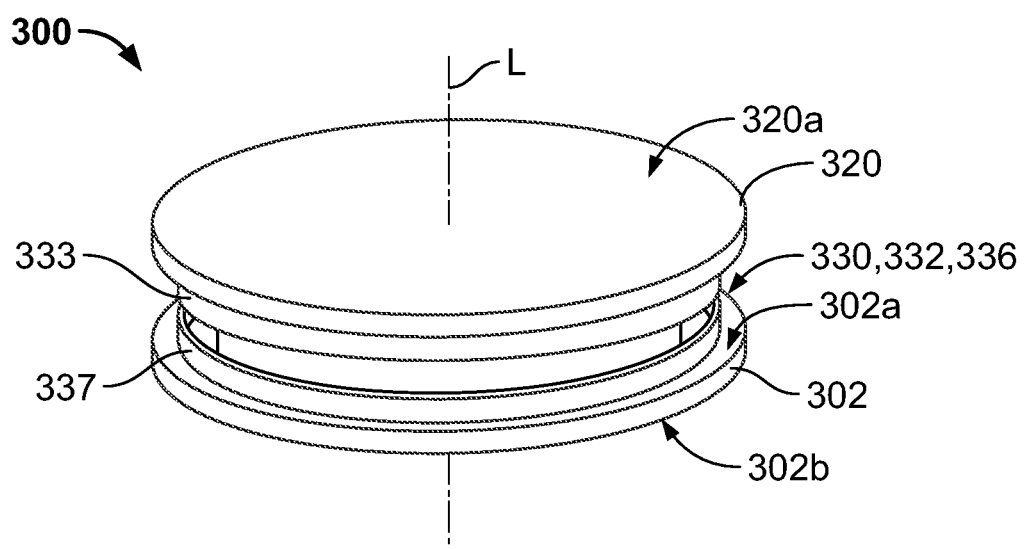
FIG. 6 illustrates a perspective view of the expandable device of FIG. 5 in a collapsed configuration in accordance with various embodiments.

A third embodiment of an expandable device 300 is shown in FIGS. 5 and 6. It will be appreciated that the expandable device 300 illustrated in FIGS. 5 and 6 may include similar features to the expandable devices 100 and 200, and thereby elements illustrated in FIGS. 5 and 6 are designated by similar reference numbers indicated on the embodiment illustrated in FIGS. 1-4, increased by 100 (relative to FIGS. 3 and 4) or 200 (relative to FIGS. 1 and 2). Accordingly, these features will not be described in substantial detail.

In this example, the expanding mechanism 310 is in the form of a resilient member 310 that is coupled to the base 302 having a top side 302a and bottom side 302b. The resilient member 310 may be a foam member or any other type of dispersed media that is selectively compressible and expandable. The resilient member 310 may be in the form of a cell structure including a number of air pockets that are expelled when a compressive force is exerted thereon. In some examples, the resilient member 310 may be a spring or other similar member. The resilient member 310 may be coupled to the top side 302a of the base 302 and the bottom side 320b of the button 320 using any number of suitable approaches. The button 320 also has a top side 320a.

Similarly to the expandable devices 100 and 200, the resilient member 310 is configured to be compressed to move the expandable device 300, and thus the button 320, between an expanded configuration (FIG. 5) and a collapsed configuration (FIG. 6) by manipulating the button 320. The resilient member 310 may be naturally biased to be positioned in the expanded configuration, and as such, upon a compressive force being removed, the resilient member 310 may return to its original, expanded form.

The user of the expandable device 300 may move the expandable device 300 from the expanded configuration (FIG. 5) to the collapsed configuration (FIG. 6) by, for example, grabbing or grasping the button 320 and pushing the button 320 downward, toward the base 302, along the longitudinal axis L. As a result, the resilient member 310 will compress upon itself, thereby releasing air from its air pockets. As a result, the button 320 will be positioned near the base 302.

Conversely, the user of the expandable device 300 may move the expandable device 300 from the collapsed configuration (FIG. 6) to the expanded configuration (FIG. 5) by, for example, grabbing or grasping the button 320 and moving (e.g., pulling) the button 320 upward, away from the base 302, along the longitudinal axis L. As a result, the resilient member 310 will return to its expanded configuration, moving the button 320 upwardly. In either of these movements, the resilient member 310 will expand or compress, respectively, to position the button 320 in the desired configuration.

The expandable device 300 may include a locking device 330 that may in turn lock, or securely retain, the expandable device 300 in the collapsed configuration. For example, the locking device 330 may be in the form of a first locking region 332 disposed on a portion of the button 320 and a second locking region 336 disposed on a portion of the base 302 that couples to the first locking region 332. In the illustrated example, the first locking region 332 is in the form of a first ring 333, and the second locking region 336 is in the form of a second ring 337. The first ring 333 is insertable into the second ring 337 when the expandable device 300 is transitioned to the collapsed configuration and accordingly, the first and second rings 333, 337 form a concentric ring arrangement whereby the first ring 333 is retained within the second ring 337 and resists the biasing force exerted by resilient member 310. In other examples, the second ring 337 may be inserted into the first ring 333.

In some examples, the first and second locking regions 332, 336 are frictionally coupled to each other. Such coupling may be sufficient to overcome the biasing force of the resilient member 310 that urges the expandable device 300 towards the expanded configuration. In other examples, the first and second locking regions 332, 336 include a corresponding protrusion and groove arrangement (not shown) whereby the protrusion is inserted into the groove to secure the locking device 330. In yet other examples, the first and second locking regions 332, 336 are in the form of a push-to-eject mechanism whereby one of the first or the second locking regions 332, 336 includes a spring-driven member that moves along a cammed track (not shown) to selectively retain or expel the other locking region 332, 336 similar to the operation of a touch latch or a press-to-open system used in click-pens. In these examples, a user may press the button 320 towards the base 302 to secure the button 320 thereto, and may again press the button 320 towards the base 302 to cause the button to be decoupled from the base 302. Other examples of push-to-release mechanisms are possible.

Figure 7:
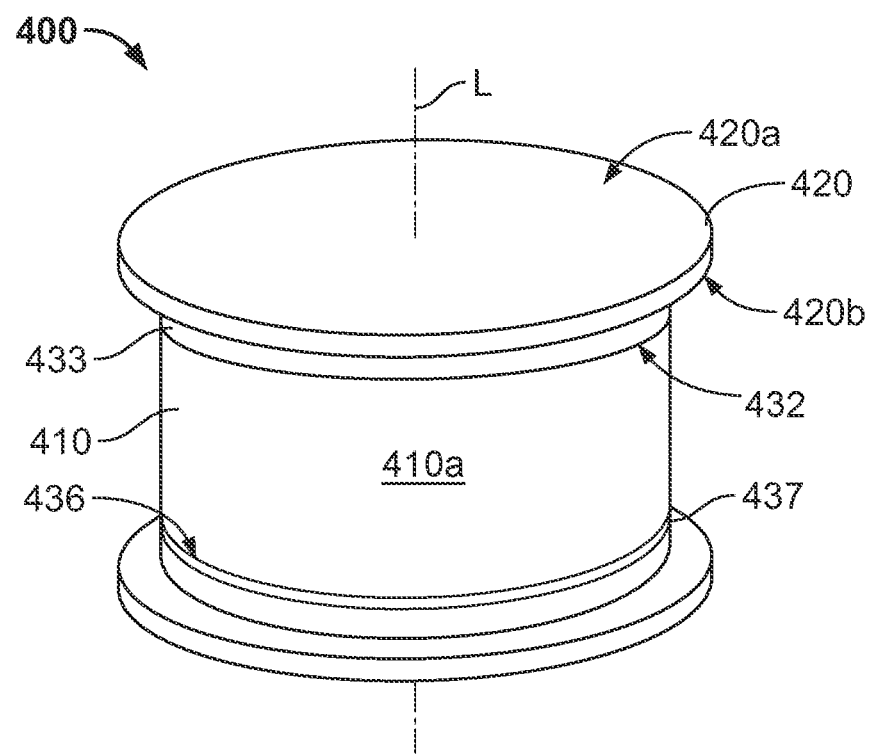
FIG. 7 illustrates a perspective view of a fourth example expandable device in accordance with various embodiments.
Figure 8:
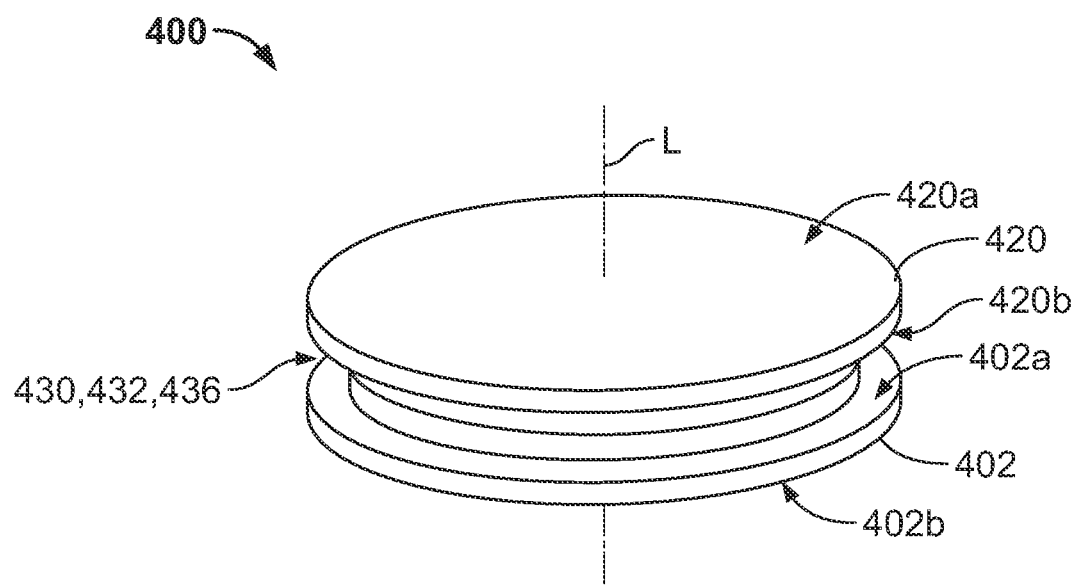
FIG. 8 illustrates a perspective view of the expandable device of FIG. 7 in a collapsed configuration in accordance with various embodiments.

A fourth embodiment of an expandable device 400 is shown in FIGS. 7 and 8. It will be appreciated that the expandable device 400 illustrated in FIGS. 7 and 8 may include similar features to the expandable devices 100 and 200, and particularly the expandable device 300; thereby, elements illustrated in FIGS. 7 and 8 are designated by similar reference numbers indicated on the embodiment illustrated in FIGS. 1-6, increased by 100 (relative to FIGS. 5 and 6), 200 (relative to FIGS. 3 and 4), or 300 (relative FIGS. 1 and 2). Accordingly, these features will not be described in substantial detail.

In this example, the expanding mechanism 410 is also in the form of a resilient member 410 that is coupled to the base 402 having a top side 402a and bottom side 402b. The resilient member 410 may be a foam member or any other type of dispersed media that is selectively compressible and expandable. The resilient member 410 may be in the form of a cell structure including a number of air pockets that are expelled when a compressive force is exerted thereon. In some examples, the resilient member 410 may be a spring or other similar member. The resilient member 410 may be coupled to the top side 402a of the base 402 and the bottom side 420b of the button 420 using any number of suitable approaches. The button 420 also has a top side 420a.

Notably, the resilient member 410 includes an integrally-formed locking region 436 disposed near the base 402. The locking region 436 may be in the form of an annular protrusion 437 extending outwardly from an outer surface 410a of the resilient member 410. This locking region 436 may couple to the locking region 432 disposed on a portion of the button 420. As with the locking region 332 of FIGS. 5 and 6, the locking region 432 may be in the form of a ring 433 that couples to the annular protrusion 437 to form a concentric arrangement whereby the annular protrusion 437 is retained within the ring 433 and resists the biasing force exerted by resilient member 410.

In other examples, the locking regions 432, 436 are in the form of a push-to-eject mechanism whereby one of the locking regions 432, 436 includes a spring-driven member that moves along a cammed track (not shown) to selectively retain or expel the other locking region 432, 436 similar to the operation of a touch latch or a press-to-open system used in click-pens. In these examples, a user may press the button 420 towards the base 402 to secure the button 420 thereto, and may again press the button 420 towards the base 402 to cause the button to be decoupled from the base 402. Other examples of push-to-release mechanisms are possible.

Figure 9:
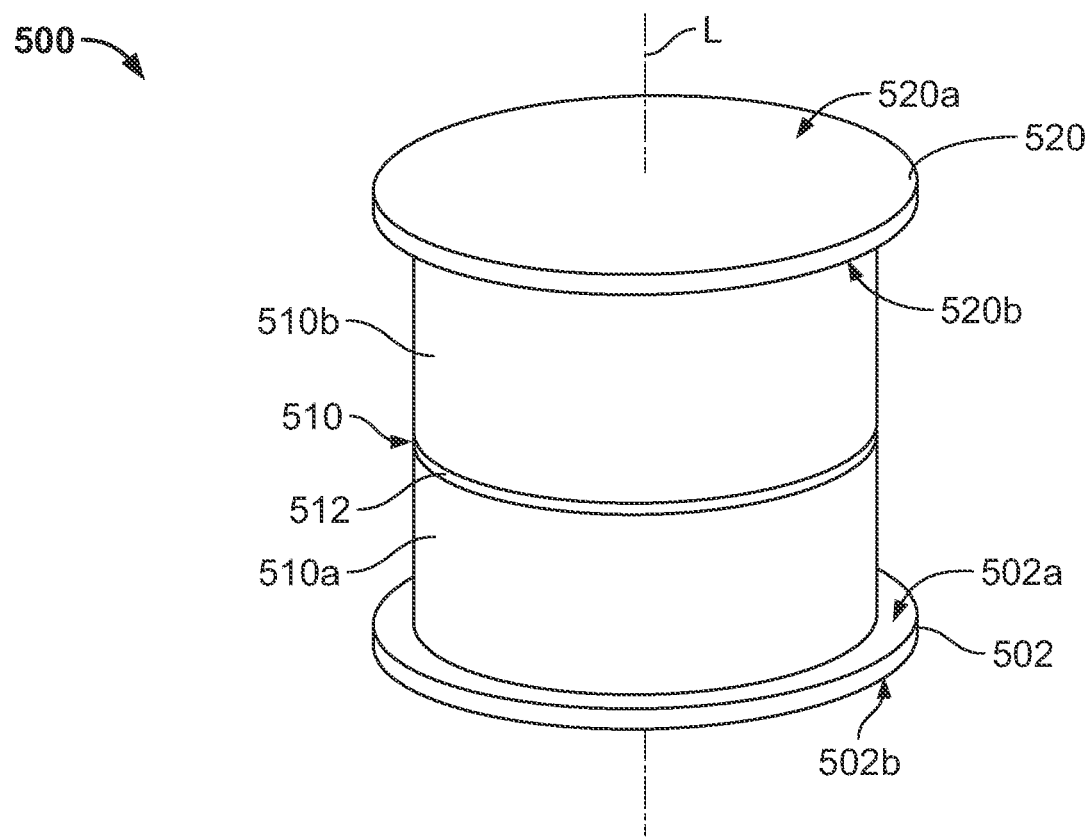
FIG. 9 illustrates a perspective view of a fifth example expandable device in accordance with various embodiments.
Figure 10:
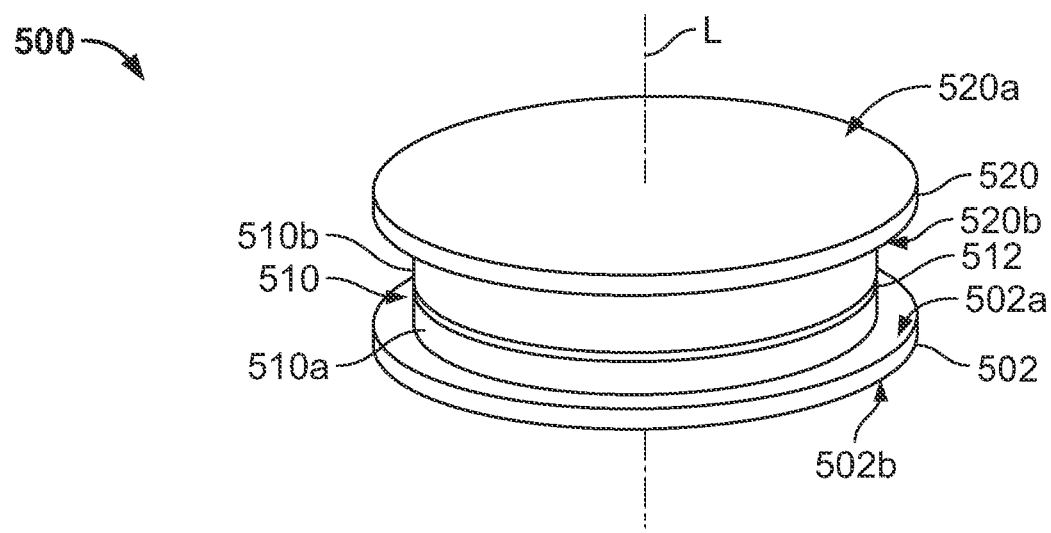
FIG. 10 illustrates a perspective view of the expandable device of FIG. 9 in a collapsed configuration in accordance with various embodiments.

A fifth embodiment of an expandable device 500 is shown in FIGS. 9 and 10. It will be appreciated that the expandable device 500 illustrated in FIGS. 9 and 10 may include similar features to the expandable devices 100 and 200, and particularly the expandable devices 300 and 400; thereby, elements illustrated in FIGS. 9 and 10 are designated by similar reference numbers indicated on the embodiment illustrated in FIGS. 1-8, increased by 100 (relative to FIGS. 7 and 8), 200 (relative to FIGS. 5 and 6), or 300 (relative FIGS. 3 and 4), or 400 (relative FIGS. 1 and 2). Accordingly, these features will not be described in substantial detail.

In this example, the expanding mechanism 510 is also in the form of a resilient member 510 that is coupled to the base 502 having a top side 502a and bottom side 502b. The resilient member 510 may be two distinct foam members 510a, 510b or any other type of dispersed media that is selectively compressible and expandable. The resilient members 510a, 510b are separated by a partition 512 constructed from any number of materials. The resilient member 510 may be in the form of a cell structure including a number of air pockets that are expelled when a compressive force is exerted thereon. In some examples, the resilient member 510 may be a first and second spring or other similar members. The first resilient member 510a may be coupled to the top side 502a of the base 502, and the second resilient member 510b may be coupled to the bottom side 520b of the button 520 using any number of suitable approaches. The button 520 also has a top side 520a. In this example, the expanding device 530 may include any one or combination of the previously described locking devices 130, 330, and/or 430 as desired.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An expandable device for attachment to a portable electronic device, the expandable device comprising:
    a base having a top side and a bottom side, the bottom side adapted to engage a portion of the portable electronic device;
    a folding mechanism operably coupled to the base; and
    a button having a top side and a bottom side, the bottom side of the button being operably coupled to the folding mechanism,
    wherein the folding mechanism is selectively movable between an expanded configuration and a collapsed configuration,
    wherein the folding mechanism comprises a plurality of foldable legs, each having a plurality of body sections partitioned by leg folds,
    wherein upon urging the button towards the collapsed configuration, the plurality of body sections for at least one of the plurality of foldable legs is caused to fold about a corresponding one or more of the leg folds,
    wherein each of the legs comprises more than two of the plurality of body sections.

2. The expandable device of claim 1, wherein the folding mechanism comprises a structure constructed from a resilient material.

3. The expandable device of claim 1, wherein, in the collapsed position, the plurality of body sections comprise acute angles between adjacent body sections.

4. The expandable device of claim 3, wherein, in the expanded configuration, the plurality of body sections comprise obtuse angles between adjacent body sections.

5. The expandable device of claim 1, wherein upon moving the button towards the expanded configuration, the plurality of body sections for at least one of the plurality of foldable legs is caused to unfold in an opposite direction as compared to said folding when urging the button towards the collapsed configuration.

6. The expandable device of claim 1, wherein the plurality of foldable legs comprises two foldable legs.

7. The expandable device of claim 1, wherein the folding mechanism is configured as a single-piece bendable member.

8. An expandable device for attachment to a portable electronic device, the expandable device comprising:
    a base having a top side and a bottom side, the bottom side adapted to engage a portion of the portable electronic device;
    a folding mechanism operably coupled to the base; and
    a button having a top side and a bottom side, the bottom side of the button being operably coupled to the folding mechanism,
    wherein the folding mechanism is selectively movable between an expanded configuration and a collapsed configuration,
    wherein the folding mechanism comprises two foldable legs, each having a plurality of body sections partitioned by one or more leg folds,
    wherein upon urging the button towards the collapsed configuration, the plurality of body sections for at least one of the plurality of foldable legs is caused to fold about corresponding ones of the one or more leg folds,
    wherein each of the legs comprises more than two of the plurality of body sections.

9. The expandable device of claim 8, wherein, in the collapsed position, the plurality of body sections comprise acute angles between adjacent body sections.

10. The expandable device of claim 9, wherein, in the expanded configuration, the plurality of body sections comprise obtuse angles between adjacent body sections.

11. The expandable device of claim 8, wherein upon moving the button towards the expanded configuration, the plurality of body sections for at least one of the two foldable legs is caused to unfold in an opposite direction as compared to said folding when urging the button towards the collapsed configuration.

12. The expandable device of claim 8, wherein the folding mechanism is configured as a single-piece bendable member.

* * * * *